April 20, 1943.  A. R. THOMAS  2,316,821
REFRIGERATION
Filed Aug. 3, 1940  3 Sheets-Sheet 1

INVENTOR.
Albert R. Thomas
BY
EA Fenander
his ATTORNEY.

INVENTOR.
Albert R. Thomas
ATTORNEY.

Patented Apr. 20, 1943

2,316,821

UNITED STATES PATENT OFFICE 2,316,821

REFRIGERATION

Albert R. Thomas, Evansville, Ind., assignor to Servel, Inc., New York, N. Y., a corporation of Delaware Application August 3, 1940, Serial No. 350,236

6 Claims. (Cl. 62—119)

This invention relates to refrigeration, and more particularly to refrigeration apparatus of the absorption type operated by heat.

In a low pressure refrigeration apparatus of this type containing only a refrigerant and an absorption liquid therefor as the two active fluid components, a generator and condenser operate at one pressure and an evaporator and absorber operate at a lower pressure, and the pressure differential may be maintained by liquid columns. The system may contain a water solution of lithium chloride, for example, with water as the refrigerant and lithium chloride solution as the absorption liquid. In order to circulate absorption liquid through and between generator and absorber without a mechanical device having moving parts, absorption liquid is raised by gas or vapor-lift action in the generator, and the raised liquid flows to the absorber and returns from the absorber to the generator by gravity.

In low pressure refrigeration apparatus of the type just described, it is important that a substantially constant quantity of liquid is circulated in the absorption liquid circuit, with variations in the quantity of circulating liquid being kept at a minimum. This is particularly true when the refrigeration apparatus contains a salt solution like a water solution of lithium chloride, for example, because a high concentration of absorption solution must be used which is close to the solidifying point. When the quantity of refrigerant out of solution and in parts of the system other than the absorption liquid circuit becomes too great, the concentration of the absorption solution becomes sufficiently high to cause such a quantity of salt to precipitate that the passages in the absorption liquid circuit are closed and blocked.

It is an object of the invention to provide an improvement in refrigeration apparatus of the type described whereby a minimum amount of liquid is retained in the condenser, evaporator and absorber, so that variations in the quantity of absorption liquid circulating in the absorption liquid circuit are at a minimum. This is accomplished by providing an evaporator and an absorber in each of which a minimum quantity of liquid is retained, and locating the evaporator above the absorber so that, after a fixed amount of refrigerant is out of absorption solution, the return of refrigerant to the solution is as rapid as the rate at which refrigerant is expelled from solution in the generator, whereby crystallization of the solution is avoided.

It is another object of the invention to provide an improved refrigeration apparatus of the type described in which the evaporator and absorber are located with respect to each other in such a manner that refrigerant vapor passes from the evaporator to the absorber in a path of flow in which the natural convection currents produced by the vapor are not opposed by heavier non-condensible or inert gas which may accumulate within the refrigeration apparatus.

It is a further object of the invention to provide a supporting frame structure for refrigeration apparatus of the type described, and to mount the parts of the apparatus on the frame structure in such a manner that a compact arrangement of parts is effected with the evaporator mounted upon and directly supported by the absorber.

The invention, together with the above and other objects and advantages thereof, will be more fully understood from the following description and accompanying drawings forming part of this space, and of which:

Figure 1:
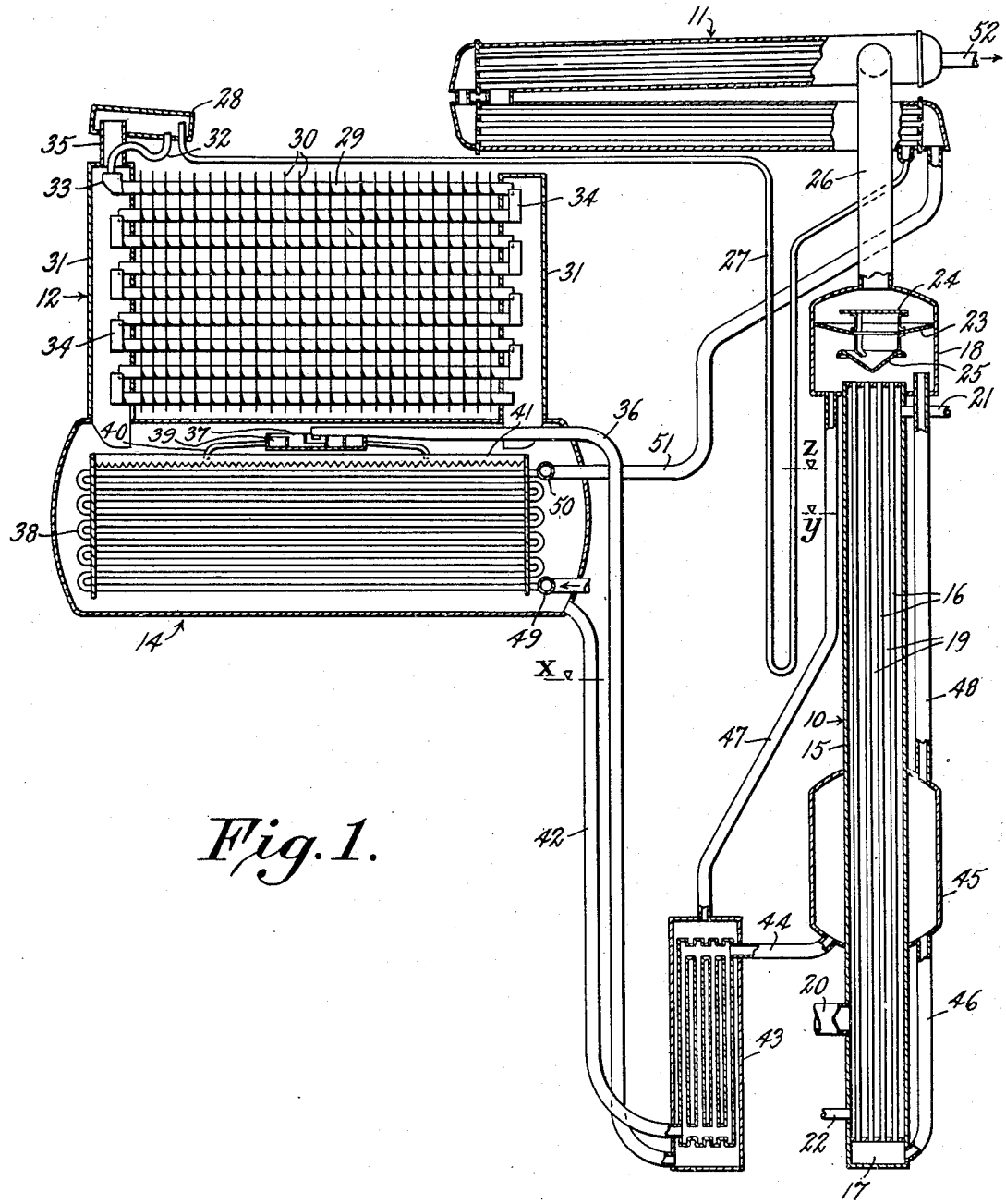
Fig. 1 is a view more or less diagrammatically illustrating absorption refrigeration apparatus in which the present invention is embodied.

Referring to Fig. 1, the present invention is embodied in a two pressure absorption refrigeration system like that described in application Serial No. 239,762 of A. R. Thomas and P. P. Anderson, Jr., filed November 10, 1938, now Patent No. 2,282,503 granted May 12, 1942. A system of this type operates at low pressures and includes a generator or expeller 10, a condenser 11, an evaporator 12 and an absorber 14 which are inter-connected in such a manner that the pressure differential in the system is maintained by liquid columns.

The disclosure in the aforementioned Thomas and Anderson application may be considered as being incorporated in this application, and, if desired, reference may be made thereto for a detailed description of the refrigeration system. In Fig. 1 the generator 10 includes an outer shell 15 within which are disposed a plurality of vertical riser tubes 16 having the lower ends thereof communicating with a space 17 and the upper ends thereof extending into and above the bottom of a vessel 18. The space 19 within shell 15 and about the tubes 16 forms a steam chamber to which steam is supplied through a conduit 20. The space 19 provides for full length preheating of riser tubes 16, and a vent 21 is provided at the upper end of shell 15. A trap conduit 22 is connected to the lower end of shell 15 above space 17 to provide a drain for condensate formed in space 19.

The system operates at a partial vacuum and contains a water solution of refrigerant in absorption liquid, such as, for example, a water solution of 40% lithium chloride by weight. With steam being supplied through conduit 20 to space 19 at atmospheric pressure, heat is applied to tubes 16 whereby water vapor is expelled from solution. The absorption liquid is raised by gas or vapor-lift action with the expelled water vapor forming a central core within an upwardly rising annulus of the liquid. The expelled water vapor rises more rapidly than the liquid and the latter follows along the inside walls of tubes 16.

The water vapor flows upwardly through the tubes or risers 16 into vessel 18 which is provided with an apertured baffle 23 and deflectors 24 and 25 at each side of the aperture in the baffle. The baffle 23 and deflectors 24 and 25 serve as a vapor separator so that expelled water vapor is separated from raised absorption liquid in vessel 18 and flows through conduit 26 into condenser 11. The water vapor is liquefied in condenser 11 and the water thus formed flows through a U-tube 27 into a flash chamber 28 and then into evaporator 12.

The evaporator 12 includes a plurality of horizontal banks of tubes 29 disposed one above the other and to which are secured heat transfer fins 30 to provide a relatively extensive heat transfer surface. The end portions of the tubes 29 pass into spaced vertical headers 31. The water flows from flash chamber 28 through a trap conduit 32 into a liquid distributing trough 33 from which the water flows into the uppermost horizontal bank of tubes 29. The water passes through successively lower banks of tubes through upright open end sections 34 at the ends of tubes 29, any excess liquid being discharged from the lowermost bank of tubes 29.

The water supplied to tubes 29 vaporizes therein to produce a refrigeration or cooling effect with consequent absorption of heat from the surroundings, as from a stream of air flowing over the exterior surfaces of the tubes 29 and fins 30. The vapor formed in tubes 29 passes out through the distributing trough 33 and open end sections 34 into the headers 31 which are connected at their lower ends to absorber 14. To prevent disturbances in evaporator 12 the flash chamber 28 is provided to take care of any vapor flashing of liquid being fed to the evaporator through U-tube 27. The flashed vapor formed in the initial cooling of the liquid flowing from the condenser passes through a conduit 35 into one of the headers 31 and mixes with vapor formed in evaporator 12.

In absorber 14 refrigerant vapor is absorbed into concentrated absorption liquid which enters through a conduit 36. The absorption liquid flows from the upper end of conduit 36 into a liquid receptacle and distributor 37 in which liquid is distributed laterally of a plurality of vertically disposed pipe banks 38 which are arranged alongside of each other. The liquid in the center compartment of receptacle 37 is subdivided and passes into a plurality of smaller end compartments 39 from which liquid flows through conduits 40 into a plurality of liquid holders and distributors 41 extending lengthwise of and above the upper most horizontal pipe sections of pipe banks 38.

Absorption liquid siphons over the walls of the liquid holders 41 with drops of liquid falling into and completely wetting the uppermost pipe sections. Liquid drips from each horizontal pipe section onto the next lower pipe section whereby all of the pipe sections are wetted with a film of liquid.

The water vapor formed in evaporator 12 passes through the headers 31 into the shell of absorber 14 and is absorbed into absorption liquid in the latter. The water vapor absorbed in the liquid dilutes the latter, and the diluted absorption liquid flows through a conduit 42, a first passage in liquid heat exchanger 43, conduit 44, vessel 45, and conduit 46 into the lower space 17 of generator 10.

Water vapor is expelled out of solution in generator 10 by heating, and the solution is raised by gas or vapor-lift action in riser tubes 16, as explained above. The absorption liquid in vessel 18 is concentrated since water vapor has been expelled therefrom in generator 10. This concentrated absorption liquid flows through a conduit 47, a second passage in liquid heat exchanger 43, and conduit 36 into the upper part of absorber 14.

The vessel 45 is cylindrical in shape and disposed about shell 15 of generator 10. The heating effect of the steam in space 19 is transmitted through a portion of shell 15 to absorption liquid in vessel 45. In this manner the absorption liquid flowing to generator 10 through conduit 46 is preheated, as described more fully in Thomas application Serial No. 347,631 filed July 26, 1940. The upper part of vessel 45 is connected by a conduit 48 to vessel 18 so that the pressure in vessel 45 is equalized with the pressure in the upper end of generator 10 and condenser 11.

The heat liberated with absorption of water vapor in absorber 14 is transferred to a cooling medium, such as water, for example, which flows upward through the vertically disposed pipe banks 38. The cooling medium is supplied through a conduit to a horizontal manifold 49 to which the lower ends of the pipe banks 38 are connected. The upper ends of the pipe banks 38 are connected to a manifold 50 to which is connected a conduit 51 through which cooling medium leaves the absorber 14. The conduit 51 is connected to condenser 11 so that the same cooling medium may be utilized to cool absorber 14 and condenser 11, with the cooling medium flowing from condenser 11 through conduit 52 to waste.

The system operates at a low pressure with the generator 10 and condenser 11 operating at one pressure and the evaporator 12 and absorber 14 operating at a lower pressure, the pressure differential therebetween being maintained by liquid columns. Thus, the liquid column formed in tube 27 maintains the pressure differential between condenser 11 and evaporator 12, the liquid column in conduit 42 maintains the pressure differential between the outlet of absorber 14 and generator 10, and the liquid column formed in conduit 36 and connected parts including conduit 47 maintains the pressure differential between the inlet of absorber 14 and generator 10. In operation, the liquid columns may form in conduits 42, 47 and the down-leg of tube 27 to the levels x, y and z, for example. The conduits are of such size that restriction to gas flow is effected without appreciably restricting flow of liquid.

The liquid column formed in vessel 45 and conduit 46 provides the liquid reaction head for raising liquid in riser tubes 16 by vapor-lift action. The vessel 45 is of sufficient volume to hold the liquid differential in the system and is of such cross-sectional area that the liquid level therein does not appreciably vary, so that a substantially constant reaction head is provided for lifting liquid in generator 10. The vessel 45 is located below absorber 14 such a distance that, for the greatest pressure differential occurring between absorber 14 and the upper part of generator 10 during operation of the system, the liquid column formed in conduit 42 is below the lower part of absorber 14.

The conduit 47 extends above the upper end of conduit 36 in order that flow of absorption liquid will take place to absorber 14 by gravity and independently of the pressure differential in the system. After the pressure differential in the system has built up and the liquid column in conduit 47 is of less height than the liquid column in conduit 36 due to the higher pressure in generator 10 than in absorber 14, gravity flow of absorption liquid still takes place from the upper part of conduit 47 to the inlet of absorber 14.

Figure 2:
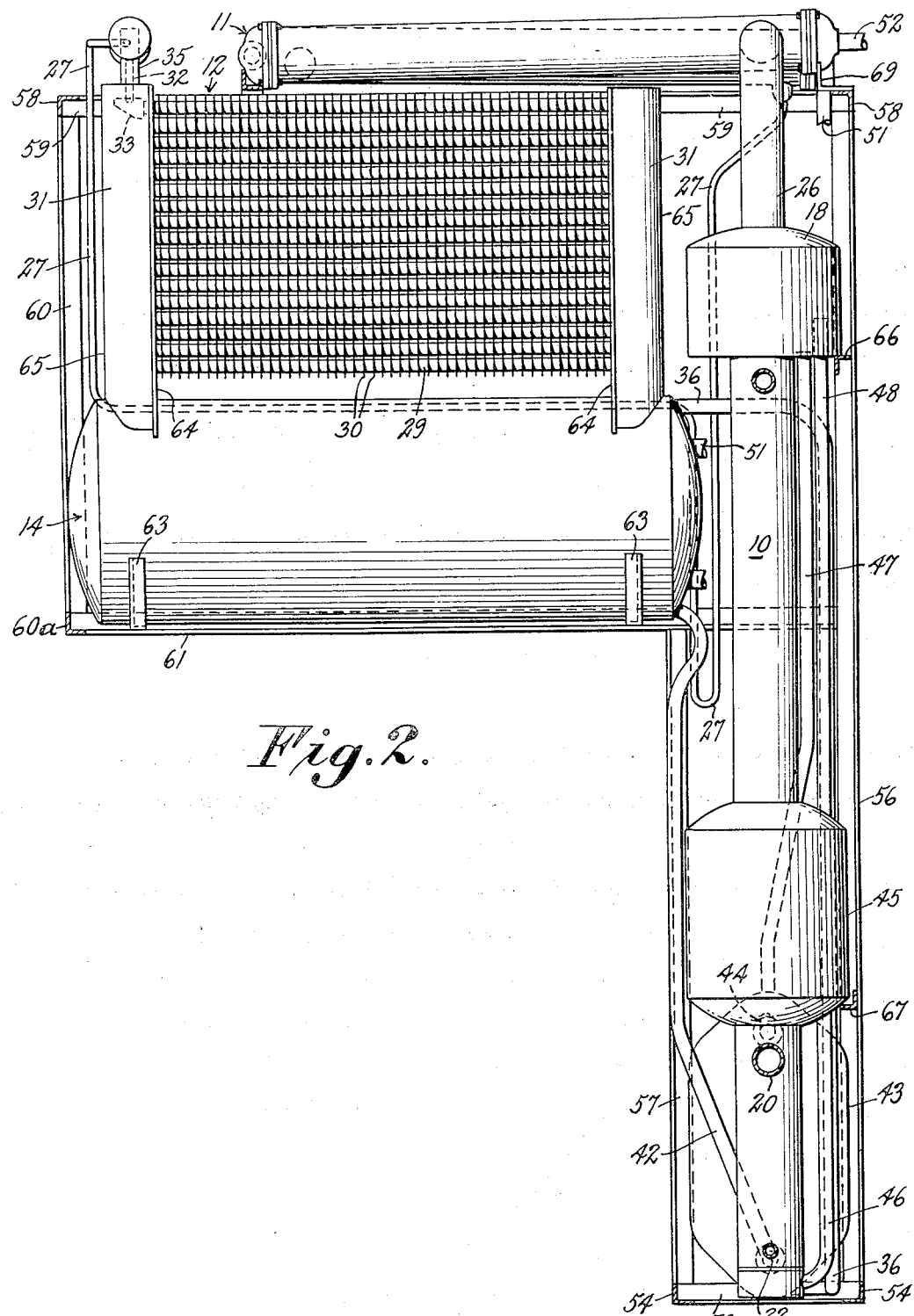
Fig. 2 is a front view, partly in section, illustrating absorption refrigeration apparatus, like that diagrammatically shown in Fig. 1, supported by a frame structure, the evaporator being disposed above and mounted on the absorber.

In Figs. 2 to 5 inclusive is shown refrigeration apparatus mounted on an open frame structure, the apparatus being like that just described and diagrammatically shown in Fig. 1, with similar parts referred to by the same reference numerals. The base of the frame structure is rectangular in shape and includes angle members 53 and 54. Four vertical angle members 56 and 57 extend upward from the corners of the rectangular base formed by angle members 53 and 54. As shown in Fig. 2, the angle members 56 at the right-hand side of generator 10 extend upward for the full height of the apparatus, and the angle members 57 at the left-hand side of the generator extend upward approximately one-half the distance of the vertical angle members 56.

Figures 3, 4, 5:
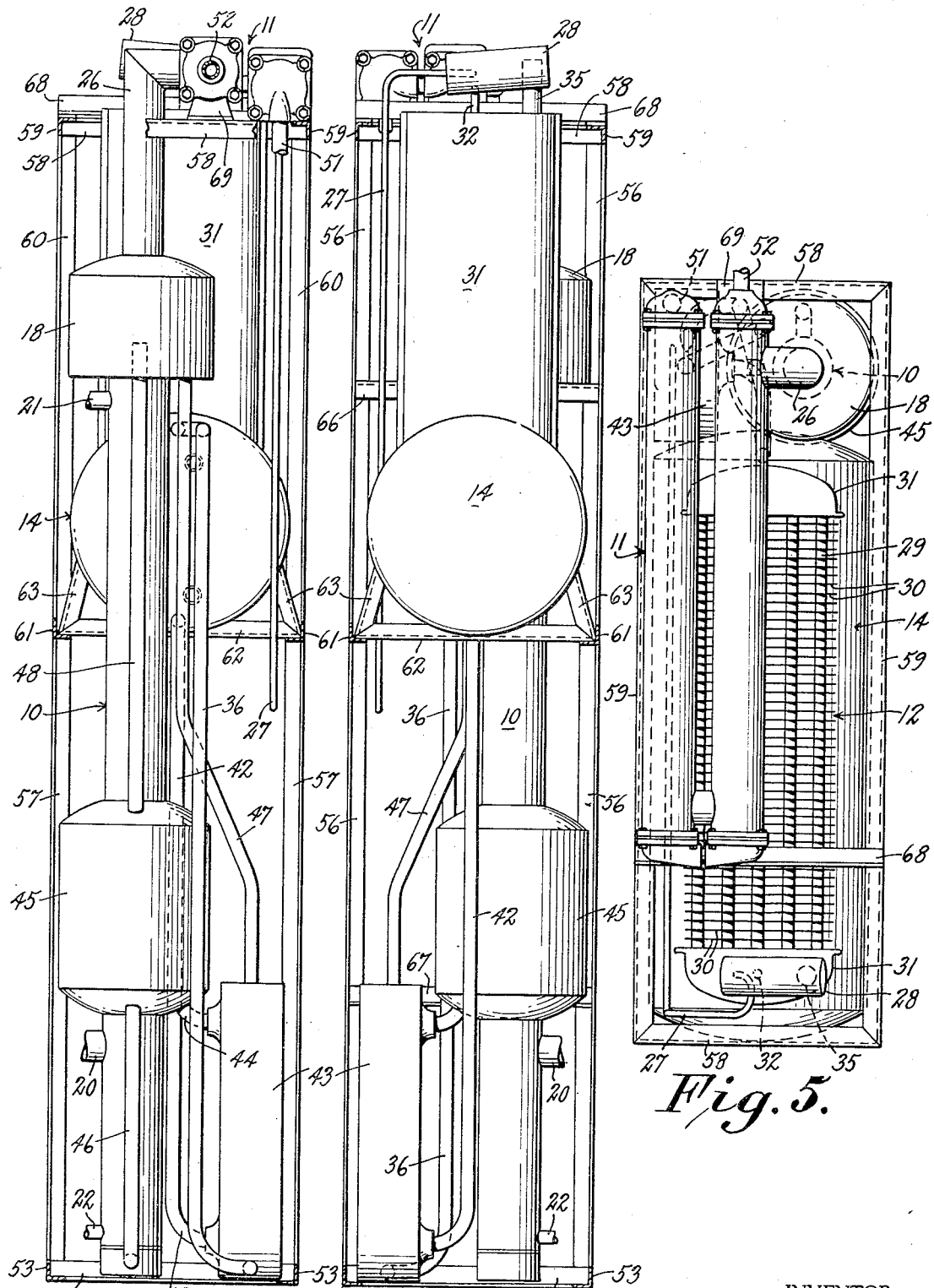
Fig. 3 is a side view, partly in section, of the refrigeration apparatus and frame structure shown in Fig. 2, illustrating more clearly the relative position of the parts when the apparatus is viewed from the generator side thereof.
Fig. 4 is a side view, partly in section, of the refrigeration apparatus and frame structure shown in Fig. 2, illustrating more clearly the relative position of the parts when the apparatus is viewed from the absorber side thereof.
Fig. 5 is a plan view of the refrigeration apparatus and frame structure shown in Figs. 2 to 4 inclusive.

The top part of the frame structure is also rectangular-shaped and includes angle members 58 and 59, as shown most clearly in Fig. 5. One of the end angle members 58 overlies the upper ends of vertical angle members 56. Two vertical angle members 60 depend from the opposite end angle member 58 of the top part of the frame structure. The lower ends of vertical angle members 60 are substantially at the same height as the upper ends of vertical angle members 57 and are connected by horizontal angle members 61 which extend from the vertical angle members 60 to the vertical angle members 56. The lower ends of vertical angle members 60 are also connected together by a cross angle member 60a.

All of the angle members just described are secured together, as by welding or brazing, for example, to provide a rigid frame structure. In order to show the parts of the refrigeration apparatus, and connecting conduits more clearly in Figs. 2 to 4 inclusive, the frame structure has been shown in section in these figures. In Fig. 2 the front angle members 53, 59, 60 and 61 are omitted and the angle members seen in this figure and referred to by these reference numerals are the angle members at the rear of the frame structure. In Fig. 3 the vertical angle members 56 extending for the full height of the refrigeration apparatus are omitted and the vertical angle members seen in this figure are the shorter vertical angle members 57 and 60 which are connected by horizontal angle members 61. In Fig. 4 the vertical angle members 57 and 60 and cross angle member 60a are omitted and the vertical angle members seen in this figure are the angle members 56 at the right-hand side of generator 10 in Fig. 2.

The absorber 14 of the refrigeration apparatus is mounted on and directly supported by the horizontal angle members 61. As shown in Figs. 2 to 4 inclusive, two angle members 62 in spaced relation extend across the horizontal angle members 61. From the ends of angle members 62 short angle members 63 extend upward and toward each other. The horizontal angle members 62 and inclined angle members 63 form cradles upon which the shell of absorber 14 is mounted, the horizontal angle members having curved cut out portions to receive the rounded bottom part of the absorber shell. The parts just described are welded together to form a rigid support for the absorber 14.

The evaporator 12 and absorber 14 form a unitary structure. The headers 31 of evaporator 12 include flat inner wall members 64 and curved outer wall member 65 having side wall portions which are secured to the edge portions of the flat inner wall members 64. The lower parts of wall members 64 and 65 are cut away so that the headers 31 can rest upon and conform to the contour of the rounded top portion of the absorber shell. The absorber shell is provided with openings corresponding to the shapes of the lower edges of headers 31, and the edges of these openings are secured by welding to the lower edges of the header wall members 64 and 65.

Since the absorber 14 is supported directly on the horizontal angle members 61 and the evaporator 12 is in turn mounted directly on the absorber, not only is a strong and rigid support obtained for these parts of the refrigeration apparatus, but a compact and novel arrangement of parts is effected with the evaporator 12 and absorber 14 occupying a minimum amount of space. It is desirable to mount the absorber 14 and evaporator 12 on the frame structure so that the evaporator tubes 29 and straight pipe sections of the absorber piping 38 are substantially horizontal and level. In fabricating the evaporator 12 and absorber 14, the evaporator tubes 29 and straight pipe sections of absorber piping 38 can be readily made parallel to each other. By mounting the evaporator 12 on the absorber 14, the evaporator tubes 29 and straight pipe sections of the absorber can be accurately leveled in a single operation when the absorber is mounted on the horizontal angle members 61.

The generator 10 and parts associated therewith, which may be referred to as the generator assembly, are located within the vertical angle members 56 and 57 and secured to this part of the frame structure, as by spot welding, for example. The liquid heat exchanger 43 is also located within the vertical angle members 56 and 57 with the lower end thereof located at and secured to the base of the frame structure.

To re-enforce the frame structure and also provide additional support for the refrigeration apparatus, horizontal angle members 66 and 67 are connected to the vertical angle members 56 at the regions of vessels 18 and 45, as shown in Fig. 2. The bottom of vessel 18 is welded to angle member 66 and the bottom rounded end of vessel 45 is welded to angle member 67.

The condenser 11 is located above evaporator 12 and supported in any suitable manner by the angle members 58 and 59 at the top of the frame structure. As shown most clearly in Figs. 2 and 5, a cross angle member 68 is secured to the angle members 59, and the end of the condenser having the return bent is welded to the angle member 68. The end of the condenser to which the conduit 51 is connected is welded to the cross angle member 58. As shown most clearly in Figs. 2 and 3, an angle bracket 69 is welded to the cross angle member 58 and to the angle bracket in turn is welded the end of the condenser to which the conduit 52 is connected.

In fabricating the refrigeration apparatus the generator assembly is arranged in the vertical frame section formed by vertical angle members 56 and 57 and secured to the frame by welding, as described above, and the evaporator-absorber structure is secured in place in the portion of the frame structure projecting from the vertically extending part. Either the generator assembly or the evaporator-absorber structure can be first mounted on the frame structure, and the condenser assembly is thereafter secured in position.

The conduits connecting the parts of the refrigeration apparatus in Figs. 2 to 5 inclusive are the same as described above in connection with the refrigeration apparatus diagrammatically shown in Fig. 1, and further description thereof will not be made here. In order to show parts of the refrigeration apparatus more clearly in Figs. 2 and 3, the conduit 51 through which cooling medium flows from absorber 14 to condenser 11 is broken away. Also, in Fig. 2 the trap conduit 32 is shown as a vertical tube instead of an S-shaped conduit as in Fig. 1. The lower end of vertical tube 32 in Fig. 2 extends below the surface level of liquid in trough 33 to provide a liquid trap like that provided by trap conduit 32 in Fig. 1. The U-tube 27 through which condensate flows from condenser 11 to evaporator 12 is formed with the down-leg located within the vertical angle members 56 and 57. The up-leg of U-tube 27 includes a horizontal portion which extends across the top of absorber 14.

In Figs. 2 to 4 inclusive it will be seen that all of the connecting conduits except the up-leg of U-tube 27 are located at one side of evaporator 12 and absorber 14 and occupy the space about generator 10. The condenser 11, evaporator 12 and absorber 14 are located one above the other and close together, so that these parts will occupy a minimum amount of space. With the evaporator 12 and absorber 14 projecting from other parts of the refrigeration apparatus located in the upright section of the frame structure, the depth of the refrigeration apparatus is no greater than the narrow dimension of the evaporator and absorber, as shown in Figs. 3 to 5 inclusive.

By locating the evaporator 12 above the absorber 14, any excess liquid refrigerant passing from the lowermost bank of tubes 29 in the evaporator immediately flows by gravity into the absorber, so that this liquid does not become trapped in a part of the apparatus and no special problem arises to effect return of unevaporated refrigerant to the absorption liquid circuit. Further, no absorption solution can get into the evaporator from the absorber by locating the former above the latter, whereby the relative position of the parts is such that only a relatively small amount of refrigerant is retained in the condenser, evaporator and connecting conduits. The condenser 11 slopes toward the outlet to which U-tube 27 is connected, so that no liquid can accumulate therein except that utilized to wet the condensing surfaces. The liquid condensate drains by gravity from the condenser 11 through U-tube 27 to the evaporator as fast as it is formed in the condenser. The evaporator tubes 29 are located and arranged so that liquid trickles along the bottom parts thereof which are free and clear, and internal screens are preferably employed to form a liquid film by capillary action, as described in my application Serial No. 350,235, filed August 3, 1940. Hence, the amount of refrigerant that is retained in evaporator 12 is small and more or less a definite quantity. After the fixed amount of liquid is retained in condenser 11, evaporator 12 and other parts during operation of the system, the return of refrigerant to absorption solution is as rapid as the expulsion of refrigerant from solution in generator 10. In this manner the concentration of the absorption solution is definitely controlled, so that precipitation of salt and crystallization of solution is avoided.

Suitable framed openings may be provided at each side of the evaporator tubes 29 to facilitate making duct connections thereto. The top of the absorber shell and flat wall members 64 of the headers 31 serve as part of the duct passage through which air flows in thermal exchange relation with the tubes 29 and fins 30 secured thereto. By locating the evaporator above the absorber, the duct connections thereto are facilitated considerably inasmuch as the refrigeration apparatus is usually located in a basement of a dwelling or building and the duct system for flow of air is located at the ceiling of the basement. With the condenser 11, evaporator 12, and absorber 14 being in alignment and one above the other, the apparatus is relatively narrow and even in installations having an ice melting capacity of five tons or greater, the complete unit can readily be moved through a door of average width.

During operation of the refrigeration apparatus non-condensible gas may form and collect therein. These non-condensible gases may be referred to as inert gas and provision may be made to remove the inert gas from the refrigeration apparatus, as by a vacuum pump, for example. By connecting the headers 31 of the evaporator to the extreme upper part of absorber shell, the most desirable flow of refrigerant vapor is obtained for trapping the inert gas. With water as a refrigerant, the water vapor formed in the evaporator 12 is less dense than the inert gas. With segregating action being effected between the inert gas and refrigerant vapor, due to the convection currents set up by the vapor flowing from the evaporator 12 to the absorber 14, the inert gas tends to collect in the lower part of the absorber shell.

In any apparatus where there is condensation or absorption, the inert gas present will always be concentrated in the farthest point in the line of flow. In the arrangement of parts described and illustrated, the bottom part of the absorber shell at a region midway between the headers 31 is the farthest point in the line of flow of refrigerant vapor passing from the evaporator headers 31. All of the inert gas is swept toward the middle or central region at the bottom of the absorber shell, the relative density of the refrigerant vapor and inert gas being such that the convection currents do not tend to counteract the separating action of the inert gas. However, if the refrigerant vapor entered the absorber at the extreme lower part thereof and tried to sweep the inert gas upward, the natural convection currents would be opposing the collection of heavier inert gas at the upper part of the absorber. With the refrigerant vapor passing from the evaporator to the extreme upper part of absorber shell, the forces produced for sweeping inert gas to the farthest point in the line of vapor flow are in the proper direction.

For example, in a refrigeration system generally like that described and having an ice melting capacity of five tons, with the system operating at full load and the evaporator at a temperature of about 50° F., the average velocity of the vapor escaping from the evaporator to the absorber is about 130 feet per second. Under these conditions the vapor pressure in the evaporator is approximately 9.25 mm. mercury and the vapor pressure in the absorber is approximately 0.1 mm. mercury lower. With the vapor passing from the evaporator to the absorber at the relatively high velocity just stated the forces produced by the escaping vapor are effectively utilized to sweep inert gas to the bottom part of the absorber shell at a region midway between the headers 31.

While a single embodiment of the invention has been shown and described, it will be apparent that modifications and changes may be made without departing from the spirit and scope of the invention, as pointed out in the following claims.

What is claimed is:

1. A multi-pressure absorption refrigeration apparatus having a generator, a condenser, an evaporator and an absorber, and members connecting the aforementioned parts for circulation of refrigerant and absorption liquid, the circulation of absorption liquid being effected by vapor-liquid lift action with the pressure differential between the generator and condenser on the one hand and the absorber and evaporator on the other hand being maintained by columns of liquid, the absorber including piping over which liquid flows to keep the piping in a wetted condition, and said evaporator including tubing inside of which refrigerant liquid flows and located relatively close to the absorber with the refrigeration apparatus being so constructed and arranged that the absorber serves as a support for the evaporator.

2. In absorption refrigeration apparatus including a generator in which refrigerant vapor is expelled from absorption liquid, a condenser in which the expelled vapor is condensed, an evaporator in which the condensate is evaporated, and an absorber including a shell into which vapor from the evoporator flows downward in the absorber for absorption into liquid in the latter, the evaporator including tubing and headers into which the tubing passes, the absorber shell having openings in the top part thereof, and the lower parts of the headers being secured to the shell at the openings.

3. In absorption refrigeration apparatus including a generator in which refrigerant vapor is expelled from absorption liquid, a condenser in which the expelled vapor is condensed, an evaporator in which the condensate is evaporated, and an absorber into which vapor passes from the evaporator and connected to receive absorption liquid into which the vapor is absorbed, an open frame comprising metal members secured together to form a rigid frame structure, the refrigeration apparatus being mounted on the frame structure with the absorber being secured directly to certain of said metal members and the evaporator being located above and mounted on the absorber.

4. In a multi-pressure absorption refrigeration apparatus including a generator in which refrigerant vapor is expelled from absorption liquid, a condenser in which the expelled vapor is condensed, an evaporator in which the condensate is evaporated, and an absorber into which vapor passes from the evaporator and connected to receive absorption liquid into which the vapor is absorbed, the generator and condenser operating at one pressure and the evaporator and absorber operating at a lower pressure with the pressure differential therebetween maintained by liquid columns, the refrigeration apparatus being so constructed and arranged that the evaporator is located above the absorber, and a frame structure, the refrigeration apparatus being arranged on the frame structure in such a manner that the absorber is mounted directly on the frame structure and serves as a support for the evaporator.

5. Refrigeration apparatus including an open frame comprising metal members secured to form a rigid frame structure having an upright section and a section projecting from the upper part of the upright section, absorption refrigeration apparatus comprising a plurality of interconnected parts including a generator, a condenser, a liquid heat exchanger, an evaporator, and an absorber, the refrigeration apparatus being so constructed and arranged that the evaporator is located above and mounted on the absorber and the condenser overlies the evaporator, the refrigeration apparatus being mounted on the frame structure so that the absorber is secured to the metal members forming the projecting section and other parts of the refrigeration apparatus including the generator and the liquid heat exchanger being located within the upright section of the frame structure.

6. In absorption refrigeration apparatus including a generator, a condenser, an evaporator comprising tubing through which liquid flows and having a plurality of straight sections alongside of each other, and an absorber including pipe sections arranged alongside of each other and over which absorption liquid flows, an open frame comprising metal members secured together to form a rigid structure, the refrigeration apparatus being so constructed and arranged that the evaporator is located above and mounted on the absorber, the refrigeration apparatus being mounted on the frame structure with the absorber being secured to certain of the metal members so that the pipe sections are substantially horizontal, and the evaporator being mounted on the absorber so that the straight sections of the tubing are also substantially horizontal.

ALBERT R. THOMAS.